US011238300B2

United States Patent
Karianakis et al.

(10) Patent No.: US 11,238,300 B2
(45) Date of Patent: Feb. 1, 2022

(54) DEPTH-BASED OBJECT RE-IDENTIFICATION

(71) Applicant: Microsoft Technology Licensing, LLC, Redmond, WA (US)

(72) Inventors: Nikolaos Karianakis, Redmond, WA (US); Zicheng Liu, Bellevue, WA (US); Yinpeng Chen, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 111 days.

(21) Appl. No.: 16/688,956

(22) Filed: Nov. 19, 2019

(65) Prior Publication Data
US 2021/0073563 A1    Mar. 11, 2021

Related U.S. Application Data

(60) Provisional application No. 62/898,501, filed on Sep. 10, 2019.

(51) Int. Cl.
*G06K 9/32* (2006.01)
*G06N 3/08* (2006.01)
*G06K 9/00* (2006.01)

(52) U.S. Cl.
CPC ....... *G06K 9/3241* (2013.01); *G06K 9/00718* (2013.01); *G06N 3/08* (2013.01)

(58) Field of Classification Search
None
See application file for complete search history.

(56) References Cited

U.S. PATENT DOCUMENTS

| 9,436,895 B1 | 9/2016 | Jones et al. | |
| 2015/0363636 A1* | 12/2015 | Tate | G06K 9/00295 382/103 |
| 2020/0097742 A1* | 3/2020 | Kumar | G06N 3/0454 |

OTHER PUBLICATIONS

Zhao, et al., "3d Gait Recognition using Multiple Cameras", In Proceedings of 7th International Conference on Automatic Face and Gesture Recognition, Apr. 10, 2006, 06 Pages.
Zhao, et al., "Deeply-Learned Part-Aligned Representations for Person Re-Identification", In Proceedings of IEEE International Conference on Computer Vision, Oct. 22, 2017, 10 Pages.
Zhao, et al., "Learning Mid-Level Filters for Person Re-Identification", In Proceedings of IEEE Conference on Computer Vision and Pattern Recognition, Jun. 23, 2014, 08 Pages.
Zhao, et al., "Person Re-Identification by Salience Matching", In Proceedings of IEEE International Conference on Computer Vision, Dec. 1, 2013, 08 Pages.

(Continued)

*Primary Examiner* — Leon Flores
(74) *Attorney, Agent, or Firm* — Alleman Hall Creasman & Tuttle LLP

(57) ABSTRACT

An object re-identifier. For each of a plurality of frames of a video, a quality of the frame is assessed and a confidence that a previously-recognized object is present in the frame is determined. The determined confidence for the frame is weighted based on the assessed quality of the frame such that frames with higher relative quality are weighted more heavily than frames with lower relative quality. An overall confidence that the previously-recognized object is present in the video is assessed based on the weighted determined confidences.

20 Claims, 8 Drawing Sheets

(56) References Cited

OTHER PUBLICATIONS

Zhao, et al., "Spindlenet: Person Re-Identification with Human Body Region Guided Feature Decomposition and Fusion", In Proceedings of IEEE Conference on Computer Vision and Pattern Recognition, Jul. 21, 2017, pp. 1077-1085.
Zhao, et al., "Unsupervised Salience Learning for Person Re-Identification", In Proceedings of IEEE Conference on Computer Vision and Pattern Recognition, Jun. 23, 2013, pp. 3586-3593.
Zheng, et al., "Learning View-Invariant Features for Person Identification in Temporally Synchronized Videos Taken by Wearable Cameras", In Proceedings of IEEE International Conference on Computer Vision, Oct. 22, 2017, pp. 2858-2866.
Zheng, et al., "Mars: A Video Benchmark for Large-Scale Person Re-Identification", In Proceedings of 14th European Conference on Computer Vision, Oct. 11, 2016, pp. 868-884.
Zheng, et al., "Person Re-Identification in the Wild", In Proceedings of IEEE Conference on Computer Vision and Pattern Recognition, Jul. 21, 2017, 10 Pages.
Zheng, et al., "Re-Identification by Relative Distance Comparison", In Journal of IEEE Transactions on Pattern Analysis and Machine Intelligence, vol. 35, Issue 3, Mar. 2013, pp. 653-668.
Zheng, et al., "Scalable Person Re-Identification: A Benchmark", In Proceedings of IEEE International Conference on Computer Vision, Dec. 7, 2015, pp. 1116-1124.
Zheng, et al., "Unlabeled Samples Generated by Gan Improve the Person Re-Identification Baseline in Vitro", In Proceedings of IEEE International Conference on Computer Vision, Oct. 22, 2017, 09 Pages.
Zhong, et al., "Re-Ranking Person Re-Identification with K-Reciprocal Encoding", In Proceedings of IEEE Conference on Computer Vision and Pattern Recognition, Jul. 21, 2017, 10 Pages.
Zhou, et al., "Detecting Humans in RGB-D Data with CNNs", In Proceedings of the 15th IAPR International Conference on Machine Vision Applications, May 8, 2017, pp. 280-283.
Zhou, et al., "Efficient Online Local Metric Adaptation via Negative Samples for Person Re-Identification", In Proceedings of IEEE International Conference on Computer Vision, Oct. 22, 2017, pp. 2439-2447.
Zhou, et al., "Point to Set Similarity Based Deep Feature Learning for Person Re-Identification", In Proceedings of IEEE Conference on Computer Vision and Pattern, Jul. 21, 2017, pp. 3741-3750.
Zhou, et al., "See the Forest for the Trees: Joint Spatial and Temporal Recurrent Neural Networks for Video-based Person Re-identification", In Proceedings of IEEE Conference on Computer Vision and Pattern Recognition, Jul. 21, 2017, pp. 4747-4756.
Liu, et al., "Stepwise Metric Promotion for Unsupervised Video Person Re-Identification", In Proceedings of IEEE International Conference on Computer Vision, Oct. 22, 2017, pp. 2429-2438.
Ioffe, et al., "Batch Normalization: Accelerating Deep Network Training by Reducing Internal Covariate Shift", In Proceedings of the 32nd International Conference on Machine Learning, Jul. 6, 2015, pp. 1-11.
Luong, et al., "Effective Approaches to Attention-Based Neural Machine Translation", In Proceedings of the Conference on Empirical Methods in Natural Language Processing, Sep. 17, 2015, pp. 1412-1421.
Ma, et al., "Local Descriptors Encoded by Fisher Vectors for Person Re-Identification", In Proceedings of Workshops and Demonslations on Computer Vision, Oct. 7, 2012, pp. 1-10.
Ma, et al., "Person Re-Identification over Camera Networks using Multi-Task Distance Metric Learning", In Proceedings of IEEE Transactions on Image Processing vol. 23, Issue 8, Aug. 2014, pp. 3656-3670.
Mansur, et al., "Gait Recognition under Speed Transition", In Proceeding of IEEE Conference on Computer Vision and Pattern Recognition, Jun. 23, 2014, pp. 2521-2528.
Martinel, et al., "Temporal Model Adaptation for Person Re-Identification", In Proceedings pf 14th European Conference on Computer Vision, Oct. 11, 2016, 18 Pages.
McLaughlin, "Recurrent Convolutional Network for Video-Based Person Re-Identification", In Proceedings of IEEE Conference on Computer Vision and Pattern Recognition, Jun. 27, 2016, pp. 1325-1334.
Mignon, et al., "PCCA: A New Approach for Distance Learning from Sparse Pairwise Constraints", In Proceedings of IEEE Conference on Computer Vision and Pattern Recognition, Jun. 16, 2012, 07 Pages.
Mnih, "Recurrent Models of Visual Attention", In Proceedings of Annual Conference on Neural Information Processing Systems, Dec. 8, 2014, 9 Pages.
Mogelmose, "Multimodal Person Reidentification using Rgb-D Sensors and a Transient Identification Database", In Proceedings of International Workshop on Biometrics and Forensics, Apr. 4, 2013, 04 Pages.
Munaro, "3d Reconstruction of Freely Moving Persons for Re-Identification with a Depth Sensor", In Proceedings of IEEE International Conference on Robotics and Automation, May 31, 2014, 08 Pages.
Munaro, et al., "One-Shot Person Re-Identification with a Consumer Depth Camera", In Publication of Springer, Jan. 4, 2014, 21 Pages.
Munsell, et al., "Person Identification using Full-Body Motion and Anthropometric Biometrics from Kinect Videos", In Proceedings of European Conference on Computer Vision, Oct. 7, 2012, pp. 91-100.
Paisitkriangkrai, et al., "Learning to Rank in Person Re-Identification with Metric Ensembles", In Proceedings of IEEE Conference on Computer Vision and Pattern Recognition, Jun. 7, 2015, pp. 1846-1855.
Pathak, et al., "Learning Features by Watching Objects Move", In Proceedings of IEEE Conference on Computer Vision and Pattern Recognition, Jul. 26, 2017, 10 Pages.
Pedagadi, et al., "Local Fisher Discriminant Analysis for Pedestrian Re-Identification", In Proceedings of IEEE Conference on Computer Vision and Pattern Recognition, Jun. 23, 2013, pp. 3318-3325.
Prosser, et al., "Person Re-Identification by Support Vector Ranking", In Proceedings of British Machine Vision Conference, Aug. 31, 2010, 11 Pages.
Qian, et al., "Multi-Scale Deep Learning Architectures for Person Re-Identification", In Proceedings of IEEE International Conference on Computer Vision, Oct. 22, 2017, 10 Pages.
Russakovsky, et al., "ImageNet Large Scale Visual Recognition Competition", In International Journal of Computer Vision, vol. 115, Issue 3, Dec. 2015, 43 Pages.
Shi, et al., "Embedding Deep Metric for Person Re-Identification: A Study Against Large Variations", In Proceedings of 14th European Conference on Computer Vision, Oct. 11, 2016, 17 Pages.
Shotton, et al., "Real-Time Human Pose Recognition in Parts from Single Depth Images", In Journal of Communications of the ACM, vol. 56, No. 1, Jan. 2013, 08 Pages.
Simonyan, et al., "Very Deep Convolutional Networks for Large-Scale Image Recognition", In Proceedings of 3rd International Conference on Learning Representations, May 7, 2015, 14 Pages.
Sivapalan, et al., "Gait Energy Volumes and Frontal Gait Recognition Using Depth Images", In Proceedings of International Joint Conference on Biometrics, Oct. 11, 2011, 06 Pages.
Song, et al., "Depth CNNs for RGB-D Scene Recognition: Learning from Scratch Better than Transferring from RGB-CNNs", In Proceedings of Thirty-First AAAI Conference on Artificial Intelligence, Feb. 12, 2017, 07 Pages.
Su, et al., "Deep Attributes Driven Multi-Camera Person Re-Identification", In Proceedings of 14th European Conference on Computer Vision, Oct. 11, 2016, 17 Pages.
Su, et al., "Pose-Driven Deep Convolutional Model for Person Re-Identification", In Proceedings of IEEE International Conference on Computer Vision, Oct. 22, 2017, pp. 3960-3969.
Sun, et al., "Deep Learning Face Representation from Predicting 10,000 Classes", In Proceedings of the IEEE Conference on Computer Vision and Pattern Recognition, Jun. 23, 2014, 08 Pages.

(56) References Cited

OTHER PUBLICATIONS

Szegedy, et al., "Going deeper with convolutions", In Proceedings of IEEE Conference on Computer Vision and Pattern Recognition, Jun. 7, 2015, pp. 1-12.

Tang, et al., "Multiple People Tracking by Lifted Multicut and Person Re-Identification", In Proceedings of IEEE Conference on Computer Vision and Pattern Recognition, Jul. 21, 2017, pp. 3539-3548.

Tao, et al., "Person Re-Identification by Regularized Smoothing Kiss Metric Learning", In Journal of IEEE Transactions on Circuits and Systems for Video Technology, vol. 23, Issue 10, Oct. 2013, pp. 1675-1685.

Thornberg, Jesper, "Combining RGB and Depth Images for Robust Object Detection using Convolutional Neural Networks", In Master Thesis of KTH Royal Institute of Technology, Oct. 1, 2015, 92 Pages.

Vezzani, et al., "People Re-Identification in Surveillance and Forensics: A Survey", In Journal of ACM Computing Surveys, vol. 46, Issue 2, Nov. 2013, 37 Pages.

Wang, et al., "Joint Learning of Single-Image and Cross-Image Representations for Person Re-Identification", In Proceedings of IEEE Conference on Computer Vision and Pattern Recognitio, Jun. 27, 2016, pp. 1288-1296.

Williams, Ronald J.., "Simple statistical gradient-following algorithms for connectionist reinforcement learning", In Journal of Machine Learning, vol. 8, Issue 3-4, May 1992, 27 Pages.

Wu, et al., "RGB-Infared Cross-Modality Person Re-Identification", In Proceedings of IEEE International Conference on Computer Vision, Oct. 22, 2017, pp. 5390-5399.

Xiao, et al., "Joint Detection and Identification Feature Learning for Person Search", In Proceedings of IEEE Conference on Computer Vision and Pattern Recognition, Jul. 21, 2017, pp. 3415-3424.

Xiao, et al., "Learning Deep Feature Representations with Domain Guided Dropout for Person Re-Identification", In Proceedings of IEEE Conference on Computer Vision and Pattern Recognition, Jun. 27, 2016, 10 Pages.

Xiong, et al., "Person Re-Identification using Kernel-Based Metric Learning Method", In Proceedings of 13th European Conference on Computer Vision, Sep. 6, 2014, 16 Pages.

Xu, et al., "Jointly Attentive Spatial-Temporal Pooling Networks for Video-Based Person Re-Identification", In Proceedings of IEEE International Conference on Computer Vision, Oct. 22, 2017, 10 Pages.

Yan, et al., "Person Re-Identification via Recurrent Feature Aggregation", In Proceedings of 14th European Conference on Computer Vision, Oct. 11, 2016, 16 Pages.

Yang, et al., "Salient Color Names for Person Re-Identification", In Proceedings of 13th European Conference on Computer Vision, Sep. 6, 2014, pp. 536-551.

Yao, et al., "Describing Videos by Exploiting Temporal Structure", In Proceedings of IEEE International Conference on Computer Vision, Dec. 7, 2015, 23 Pages.

Yi, et al., "Deep Metric Learning for Person Re-Identification", In Proceedings of 22nd International Conference on Pattern Recognition, Aug. 24, 2014, 6 Pages.

Yosinski, et al., "How Transferable are Features in Deep Neural Networks?", In Proceedings of Advances in Neural Information Processing Systems, Dec. 8, 2014, 9 Pages.

Yu, et al., "Cross-View Asymmetric Metric Learning for Unsupervised Person Re-Identification", In Proceedings of IEEE International Conference on Computer Vision, Oct. 22, 2017, 10 Pages.

Zaremba, et al., "Learning to Execute", In Journal of Computing Research Repository, Oct. 17, 2014, 08 Pages.

Zeng, et al., "Silhouette-Based Gait Recognition via Deterministic Learning", In Journal of Pattern Recognition, vol. 47, Issue 11, Nov. 1, 2014, pp. 3568-3584.

Zhang, et al., "Learning a Discriminative Null Space for Person Re-Identification", In Proceedings of IEEE Conference on Computer Vision and Pattern Recognition, Jun. 27, 2016, 10 Pages.

Zhang, et al., "People Re-identification using Deep Convolutional Neural Network", In Proceedings of the International Conference on Computer Vision Theory and Applications, Jan. 5, 2014, 08 Pages.

Ahmed, et al., "An Improved Deep Learning Architecture for Person Re-Identification", In Proceedings of IEEE Conference on Computer Vision and Pattern Recognition, Jun. 7, 2015, pp. 3908-3916.

Albiol, et al., "Who is Who at Different Cameras: People Re-Identification Using Depth Cameras", In Journal of IET Computer Vision, vol. 6, Issue 5, Oct. 22, 2012, pp. 378-387.

Andersson, et al., "Anthropometric and Human Gait Identification Using Skeleton Data from Kinect Sensor", In Proceedings of the 29th Annual ACM Symposium on Applied Computing, Mar. 24, 2014, pp. 60-61.

Bai, et al., "Scalable Person Re-Identification on Supervised Smoothed Manifold", In Proceedings of IEEE Conference on Computer Vision and Pattern Recognition, Jul. 21, 2017, pp. 2530-2539.

Bak, "One-Shot Metric Learning for Person Re-Identification", In Proceedings of IEEE Conference on Computer Vision and Pattern, Jul. 21, 2017, pp. 1571-1580.

Barbosa, et al., "Re-identification with RGB-D sensors", In Proceedings of the 12th International Conference on Computer Vision, Oct. 7, 2012, 10 Pages.

Bedagkar-Gala, et al., "A Survey of Approaches and Trends in Person Re-Identification", In Journal of Image and Vision Computing, vol. 32, Issue 4, Apr. 2014, pp. 270-286.

Boureau, "A Theoretical Analysis of Feature Pooling in Visual Recognition", In Proceedings of the 27th International Conference on International Conference on Machine Learning, Jun. 21, 2010, 08 Pages.

Castro, et al., "Automatic Learning of Gait Signatures for People Identification", In Proceedings of 14th International Work-Conference on Artificial Neural Networks, Jun. 14, 2017, pp. 1-10.

Castro, et al., "Pyramidal Fisher Motion for Multiview Gait Recognition", In Proceedings of 22nd International Conference on Pattern Recognition, Aug. 24, 2014, pp. 1692-1697.

Chan, et al., "Listen, Attend and Spell", In Repository of arXiv:1508.01211, Aug. 20, 2015, pp. 1-16.

Chen, et al., "A New LDA-Based Face Recognition System Which Can Solve the Small Sample Size Problem", In Journal of Pattern Recognition, vol. 33, Issue 10, Oct. 1, 2000, pp. 1713-1726.

Chen, et al., "Beyond Triplet Loss: A Deep Quadruplet Network for Person Re-Identification", In Proceedings of IEEE Conference on Computer Vision and Pattern Recognition, Jul. 21, 2017, pp. 403-412.

Chen, et al., "Fast Person Re-Identification via Cross-Camera Semantic Binary Transformation", In Proceedings of IEEE Conference on Computer Vision and Pattern Recognition, Jul. 21, 2017, pp. 5330-5339.

Chen, et al., "Similarity Learning with Spatial Constraints for Person Re-Identification", In Proceedings of IEEE Conference on Computer Vision and Pattern Recognition, Jun. 27, 2016, pp. 1268-1277.

Cho, et al., "Improving Person Re-Identification via Pose-Aware Multi-Shot Matching", In Proceedings of IEEE Conference on Computer Vision and Pattern Recognition, Jun. 27, 2016, pp. 1354-1362.

Chung, et al., "A Two Stream Siamese Convolutional Neural Network for Person Re-Identification", In Proceedings of IEEE International Conference on Computer Vision, Oct. 22, 2017, pp. 1983-1991.

Collobert, et al., "Torch7: A Matlab-like Environment for Machine Learning", In Proceedings of the NIPS Workshop on BigLearn, Dec. 16, 2011, pp. 1-6.

Ding, et al., "Deep Feature Learning with Relative Distance Comparison for Person Re-Identification*", In Journal of Pattern Recognition, vol. 48, Issue 10, Oct. 1, 2015, 29 Pages.

Donahue, et al., "Long-Term Recurrent Convolutional Networks for Visual Recognition and Description", In Journal of IEEE Transactions on Pattern Analysis and Machine Intelligence, vol. 39, Issue 4, Sep. 1, 2016, pp. 2625-2634.

(56) References Cited

OTHER PUBLICATIONS

Dubois, et al., "A Gait Analysis Method Based on a Depth Camera for Fall Prevention", In Proceedings of 36th Annual International Conference of the IEEE Engineering in Medicine and Biology, Aug. 26, 2014, pp. 4515-4518.

Eitel, et al., "Multimodal Deep Learning for Robust RGB-D Object Recognition", In Proceedings of the International Conference on Intelligent Robots and Systems, Sep. 28, 2015, 07 Pages.

Farenzena, et al., "Person Re-Identification by Symmetry-Driven Accumulation of Local Features", In Proceedings of IEEE Computer Society Conference on Computer Vision and Pattern Recognition, Jun. 13, 2010, pp. 2360-2367.

Gong, et al., "Person Re-Identification", In Publication of Springer, Oct. 10, 2013, 36 Pages.

Gray, et al., "Viewpoint Invariant Pedestrian Recognition with an Ensemble of Localized Features", In Proceedings of 10th European Conference on Computer Vision, Oct. 12, 2008, pp. 262-275.

Gupta, et al., "Learning Rich Features from Rgb-D Images for Object Detection and Segmentation", In Proceedings of 13th European Conference on Computer Vision, Sep. 6, 2014, pp. 345-360.

Hafner, et al., "A Cross-Modal Distillation Network for Person Re-identification in RGB-Depth", In Journal of Computing Research Repository, Oct. 27, 2018, pp. 1-18.

Haque, et al., "Recurrent Attention Models for Depth-Based Person Identification", In Proceedings of IEEE Conference on Computer Vision and Pattern Recognition, Jun. 27, 2016, Apr. 3, 2019.

Hinton, et al., "Improving Neural Networks by Preventing Co-Adaptation of Feature Detectors", In Journal of Computing Research Repository, Jul. 3, 2012, pp. 1-18.

Hofmann, et al., "The TUM Gait from Audio, Image and Depth (GAID) database: Multimodal recognition of subjects and traits", In Journal of Visual Communication and Image Representation, vol. 25, Issue 1, Jan. 1, 2014, pp. 1-27.

Ioannidis, et al., "Gait Recognition Using Compact Feature Extraction Transforms and Depth Information", In Journal of IEEE Transactions on Information Forensics and Security, vol. 2, Issue 3, Sep. 2007, pp. 623-630.

Jia, et al., "Caffe: Convolutional Architecture for Fast Feature Embedding", In Proceedings of the 22nd ACM International Conference on Multimedia, Nov. 3, 2014, pp. 675-678.

Kale, et al., "Gait Analysis For Human Identification", In Proceedings of the 4th International Conference on Audio-and Video-Based Biometric Person Authentication, Jun. 9, 2003, pp. 1-8.

Karayev, et al., "Recognizing Image Style", In Proceedings of British Machine Vision Conference, Sep. 1, 2014, pp. 1-20.

Karianakis, et al., "Person Depth ReID: Robust Person Re-identification with Commodity Depth Sensors", In Journal of Computing Research Repository, May 28, 2017, 14 Pages.

Kodirov, et al., "Person Re-Identification by Unsupervised ?1 Graph Learning", In Proceedings of 14th European Conference on Computer Vision, Oct. 11, 2016, pp. 1-18.

Koestinger, et al., "Large Scale Metric Learning from Equivalence Constraints", In Proceedings of IEEE Conference on Computer Vision and Pattern Recognition, Jun. 16, 2012, pp. 2288-2295.

Kontoravdis, et al., "Enhancing Stochasticity in Reinforcement Learning Schemes: Application to the Exploration of Binary Domains", In Journal of intelligent systems, vol. 5, Issue 1, Mar. 1, 1995, pp. 49-77.

Krizhevsky, et al., "ImageNet Classification with Deep Convolutional Neural Networks", In Proceedings of Advances in Neural Information Processing Systems, Dec. 3, 2012, pp. 1-9.

Kviatkovsky, et al., "Color Invariants for Person Re-Identification", In Journal of IEEE Transactions on Pattern Analysis and Machine Intelligence, vol. 35, Issue 7, Jul. 2013, pp. 1622-1634.

Larochelle, et al., "Exploring Strategies for Training Deep Neural Networks", In the Journal of Machine Learning Research, Jan. 10, 2009, pp. 1-40.

Li, et al., "DeepReID: Deep Filter Pairing Neural Network for Person Re-Identification", In Proceedings of IEEE Conference on Computer Vision and Pattern Recognition, Jun. 23, 2014, pp. 152-159.

Li, et al., "Learning Deep Context-Aware Features Over Body and Latent Parts for Person Re-Identification", In Proceedings of IEEE Conference on Computer Vision and Pattern Recognition, Jul. 21, 2017, 10 Pages.

Li, et al., "Learning Locally-Adaptive Decision Functions for Person Verification", In Proceedings of IEEE Conference on Computer Vision and Pattern Recognition, Jun. 23, 2018, pp. 3610-3617.

Li, "Sequential Person Recognition in Photo Albums with a Recurrent Network", In Proceedings of IEEE Conference on Computer Vision and Pattern Recognition, Jul. 21, 2017, pp. 1338-1346.

Liao, et al., "Person Re-Identification by Local Maximal Occurrence Representation and Metric Learning", In Proceedings of IEEE Conference on Computer Vision and Pattern Recognition, Jun. 7, 2015, pp. 2197-2206.

Likas, Aristidis, "A Reinforcement Learning Approach to Online Clustering", In Journal of Neural Computation, vol. 11, Issue 8, Nov. 15, 1999, pp. 1915-1932.

Lin, et al., "Consistent-Aware Deep Learning for Person Re-Identification in a Camera Network", In Proceedings of IEEE Conference on Computer Vision and Pattern Recognition, Jul. 21, 2017, pp. 5771-5780.

Lisanti, "Matching People Across Camera Views using Kernel Canonical Correlation Analysis", In Proceedings of the International Conference on Distributed Smart Cameras, Nov. 4, 2014, 06 Pages.

Lisanti, et al., "Person Re-Identification by Iterative Re-Weighted Sparse Ranking", In Journal of IEEE Transactions on Pattern Analysis and Machine Intelligence, vol. 37, Issue 8, Aug. 1, 2015, pp. 1629-1642.

* cited by examiner

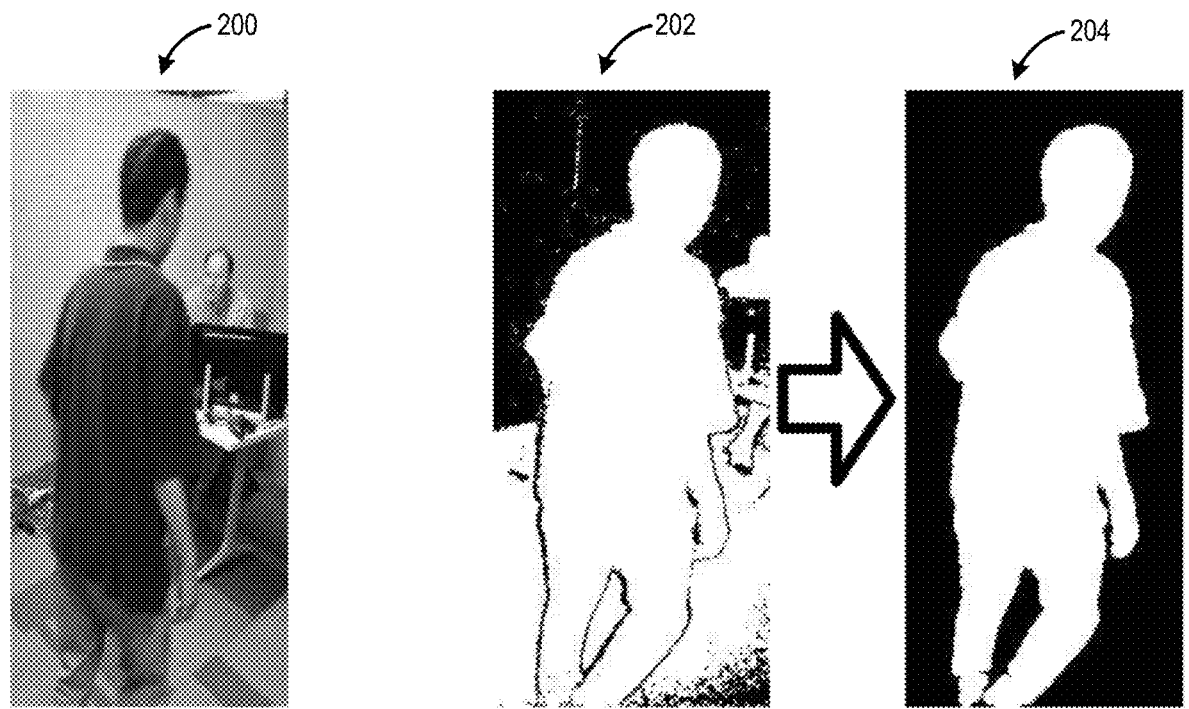
FIG. 2
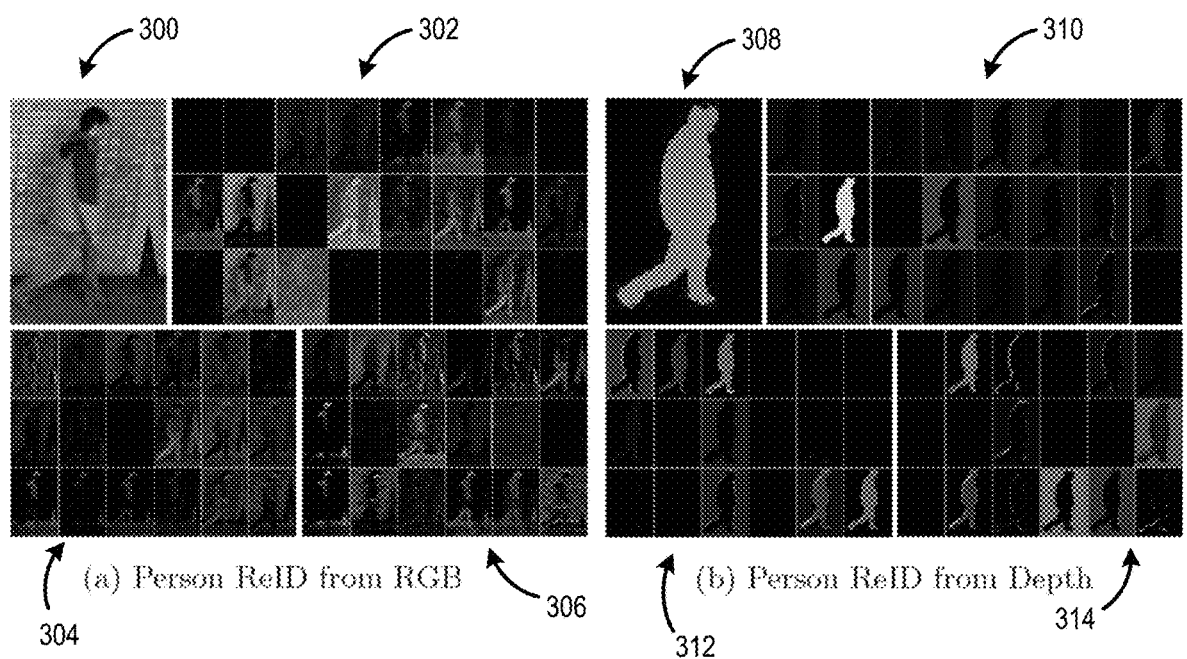
(a) Person ReID from RGB
FIG. 3A
(b) Person ReID from Depth
FIG. 3B

Table 1. Single-shot and multi-shot person re-identification performance on the test set of DPI-T, BIWI and IIT PAVIS. Dashes indicate that no published result is available

| Mode | Method | Top-1 Accuracy (%) | | |
|---|---|---|---|---|
| | | DPI-T | BIWI | IIT PAVIS |
| Single-shot | Random | 8.3 | 2.0 | 1.3 |
| | Skeleton (NN) | – | 21.1 | 28.6 |
| | Skeleton (SVM) | – | 13.8 | 35.7 |
| | 3D RAM | 47.5 | 30.1 | 41.3 |
| | method (CNN) | 66.8 | 25.4 | 43.0 |
| Multi-shot | Skeleton (NN) | – | 30.3 | – |
| | Skeleton (SVM) | – | 17.9 | – |
| | Energy Volume | 14.2 | 25.7 | 18.9 |
| | 3D CNN+Avg Pooling | 28.4 | 27.8 | 27.5 |
| | 4D RAM | 55.6 | 45.3 | 43.0 |
| | method (CNN-LSTM+Avg Pooling) | 75.5 | 45.7 | 50.1 |
| | method with attention from | 75.9 | 46.4 | 50.6 |
| | method with RTA attention | 76.3 | 50.0 | 52.4 |

FIG. 8

Table 2. Top-1 re-identification accuracy (top-1, %) and normalized Area Under the Curve (nAUC, %) on TUM-GAID in new-clothes scenario with single-shot (ss) and multi-shot (ms) evaluation

| Modality | top-1 | nAUC |
|---|---|---|
| *Body RGB (ss)* | 41.8 | 74.3 |
| *Body Depth (ss)* | 48.0 | 85.0 |
| *Body Depth & RGB (ss)* | 48.6 | 81.9 |
| *Head RGB (ss)* | 59.4 | 79.5 |
| *Body Depth & Head RGB (ss)* | 65.4 | 85.2 |
| *Body RGB (ms: LSTM & RTA)* | 50.0 | 79.9 |
| *Body Depth (ms: LSTM)* | 56.3 | 87.7 |
| *Body Depth (ms: LSTM & RTA)* | 59.4 | 89.6 |
| *Head RGB (ms: LSTM & RTA)* | 65.6 | 81.0 |
| *Body Depth & Head RGB (ms: LSTM & RTA)* | 75.0 | 88.1 |

FIG. 9

DEPTH-BASED OBJECT RE-IDENTIFICATION

CROSS REFERENCE TO RELATED APPLICATIONS

This application claims priority to U.S. Provisional Patent Application Ser. No. 62/898,501, filed Sep. 10, 2019, the entirety of which is hereby incorporated herein by reference for all purposes.

BACKGROUND

Object re-identification or the process of recognizing a previously-identified object is a fundamental problem in computer vision and has attracted significant attention in recent years. Object re-identification has wide applicability and utility in areas such as robotics, multimedia, forensics, autonomous driving, and cashier-free shopping, among other applications. When a previously-recognized object is captured by cameras with non-overlapping views, or by the same camera at different times, the goal of object re-identification is to recognize the object across different views among a large number of other imposter objects. Object re-identification is a difficult problem because of the visual ambiguity in an object's appearance due to large variations in illumination, pose, camera settings, and viewpoint. The object re-identification problem may be further complicated by partial occlusions and/or a cluttered background.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

An object re-identification method is disclosed. For each of a plurality of frames of a video, a quality of the frame of the video is assessed and a confidence that a previously-recognized object is present in the frame of the video is determined. The determined confidence for each frame is weighted based on the assessed quality of the frame such that frames with higher relative quality are weighted more heavily than frames with lower relative quality. An overall confidence that the previously-recognized object is present in the video is assessed based on the weighted determined confidences.

BRIEF DESCRIPTION OF THE DRAWINGS

FIG. 2 shows different preprocessing operations applied to an example image frame of an input video.

FIGS. 3A and 3B show filter responses of different color and depth based models applied to corresponding image frames.

FIG. 8 shows a table indicating re-identification accuracy from performing different single-shot and multi-shot person re-identification operations by different models on a plurality of different test datasets.

FIG. 9 shows a table indicating re-identification accuracy and normalized Area Under the Curve (nAUC, %) of different models performing single-shot and multi-shot person re-identification operations on a test data set.

DETAILED DESCRIPTION

Figure 1:
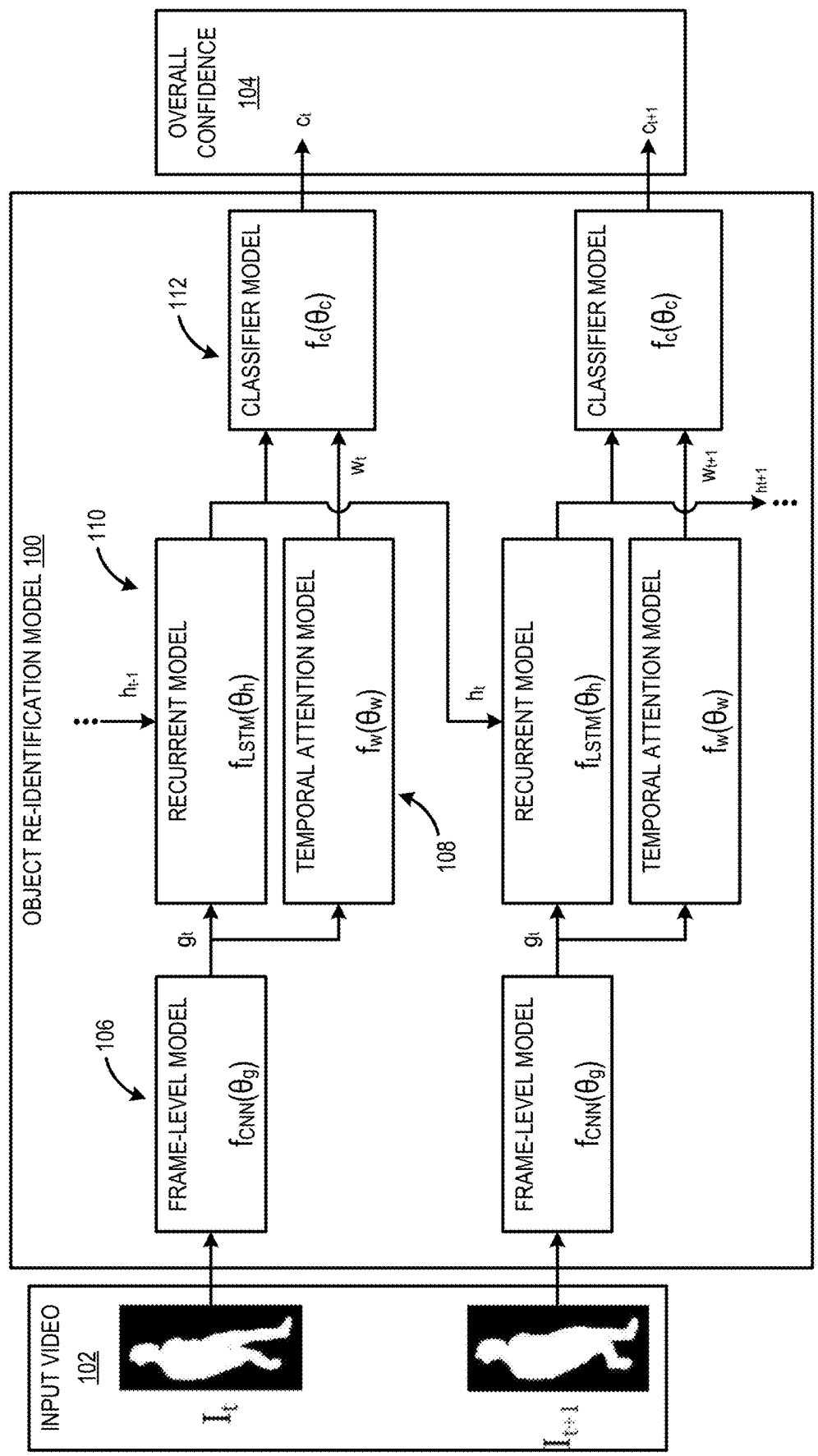
FIG. 1 shows an example depth-based object re-identification model.

Existing methods of object re-identification typically focus on designing invariant and discriminant features, which can enable identification despite nuisance factors such as scale, location, partial occlusion and changing lighting conditions. Using such existing methods, higher-dimensional descriptors and deep convolutional architectures are thought to improve robustness. In spite of the ongoing quest for effective representations, it is still challenging to deal with very large variations such as ultra wide-baseline matching and dramatic changes in illumination and resolution, especially with limited training data.

Accordingly, the present disclosure is directed to an approach for object re-identification using data derived from video that can be acquired by commodity image sensors. In particular, object re-identification is performed by a machine-learning object re-identification model previously trained to output an overall confidence that a previously-recognized object is present in the video. The overall confidence is assessed based on a collection of weighted frame-level confidences indicating that the previously-recognized object is present in a particular frame of the video. Each frame-level confidence is weighted based on an assessed quality of the frame of the video such that frames of the video with higher relative quality are weighted more heavily than frames of the video with lower relative quality.

In some implementations, the object re-identification model may include a temporal attention model that is previously-trained to adjust the weights. In one example, the temporal attention model is configured to model the weight of each frame prediction as a Bernoulli-sigmoid unit that acts upon frame-level features. Since this unit is stochastic, the temporal attention parameters may be trained using reinforcement learning. Such reinforced temporal attention on top of the frame-level features may leverage the temporal information from video sequences by learning to adaptively weight the predictions of individual frames based on a task-based reward.

In some implementations, the object re-identification model may be configured to perform object re-identification on depth video. Depth-based object re-identification may be less susceptible to scenarios with significant lighting changes and color changes relative to previous color (e.g., red, green, blue (RGB))-based object re-identification approaches. One challenge for depth-based object re-identification is scarcity of depth-based training data. The disclosed approach addresses the data scarcity problem by using a split-rate color (e.g., RGB)-to-Depth transfer scheme to modify a previously-trained color-based object re-identification model into to a depth-based object re-identification model, which leverages large RGB training datasets more effectively than popular fine-tuning approaches. Such a split-rate transfer scheme is based on the observation that the model parameters at the bottom layers of a deep convolutional neural network can be directly shared between RGB and depth data while the remaining layers can be fine-tuned more rapidly. At first glance, such an observation may be inconsistent with a contention that the bottom layers cannot be shared between RGB and depth models. However, such behavior is in part specific to HHA depth encoding, which need not be used in the herein disclosed approach. The herein disclosed approach addresses the data scarcity problem in depth-based person re-identification by leveraging the large amount of RGB training data to obtain stronger frame-level features in the object re-identification model.

FIG. 1 schematically shows an example machine-learning object re-identification model 100. The object re-identification model 100 may be implemented using any suitable computer, such as computing system 1200 shown in FIG. 12 and discussed in further detail below. The object re-identification model 100 may be previously-trained to receive an input video 102 (or data derived therefrom), and assess an overall confidence 104 that a previously-recognized object is present in the input video data 102. The object re-identification model 100 may be trained to re-identify any suitable previously-identified object. For example, the object re-identification model 100 may be previously-trained to re-identify one or more previously-identified human subjects, such that the object re-identification model 100 assesses, for each human subject, an overall confidence 104 that the previously-recognized human subject is present in the input video 102.

The input video 102 may take any suitable form. In some implementations, the input video may include depth video having a plurality of depth frames. In some implementations, the input video may include color video (e.g., RGB color) including a plurality of image frames. In one example, the input video 102 includes raw depth measurements from a depth camera (e.g., Kinect V2). The input video includes depth images $D \in Z^{512 \times 424}$, where each pixel $D[i,j], i \in [1,512]$, $j \in [1,424]$, contains the Cartesian distance, in millimeters, from the image plane to the nearest object at the particular coordinate (i,j). In "default range" setting, the intervals [0, 0.4 m ) and (8.0 m,∞) are classified as unknown measurements, [0.4, 0.8)[m] as "too near", (4.0, 8.0][m] as "too far" and [0.8, 4.0][m] as "normal" values.

In some implementations, the input video 102 optionally may be pre-processed to identify the body index $B \in Z^{512 \times 424}$, where 0 corresponds to background and a positive integer i for each pixel belonging to the person i. Example preprocessing of a frame of an input video is shown in FIG. 2. Image frame 200 is a cropped "raw" color image (illustrated in black and white). Image frame 202 is a grayscale depth representation $D_p^g$. After extracting the person region $D_p \subset D$, the measurements within the "normal" region may be normalized in the range [1,256], while the values from "too far" and "unknown" range may be set as 256, and values within the "too near" range may be set as 1. In practice, in order to avoid a concentration of the values near 256, whereas other values, say on the floor in front of the subject, span the remaining range, an offset $t_o=56$ may be introduced and normalized in [1, 256−$t_o$]. Image frame 204 is the result after background subtraction using the body index information $B_p$ from skeleton tracking. Such preprocessing results in the "grayscale" person representation $D_p^g$. When the body index is available, Bp ⊂ B is deployed as a mask on the depth region $D_p$ in order to achieve background subtraction before applying range normalization. Any suitable pre-processing operations may be performed on the input video 102 prior to the input video being provided as input to the object re-identification model 100.

Returning to FIG. 1, an architecture of the object re-identification model 100 may be formulated as a sequential decision process that performs human recognition from a partially observed environment via video sequences. At each time step, the object re-identification model 100 receives data derived from input video 102 via one or more cameras, calculates a feature vector using a frame-level model ($f_{CNN}$) 106 that is based on a deep Convolutional Neural Network (CNN), for example. The frame-level model 106 provides input to both a recurrent model ($f_{LSTM}$) and a temporal attention model ($f_w$) 108. The temporal attention model 108 actively infers the importance of the current frame for the re-identification task using Reinforced Temporal Attention (RTA). On top of the CNN features, a recurrent model 110 includes a Long Short-Term Memory (LSTM) unit that models shortrange temporal dynamics. A classifier model 112 is attached to a hidden state $h_t$ of the recurrent model 110, and the classifier model 112 makes a video prediction that is weighted by the output of the temporal attention model 108. In particular, the classifier model 112 calculates the weighted sum of single-frame predictions, where the weights $w_t$ for each frame t are predicted by the temporal attention model 108. At each time step, the classifier model 112 receives a reward based on the success or failure of a classification task performed by the classifier model 112, and the classifier model 112 may be trained to maximize the sum of rewards over time. The object re-identification model 100 outputs an overall confidence 104 indicating that a previously-identified object is present in the video collectively based on weighted classification tasks performed for each frame by the classifier model 112.

The problem solved by the object re-identification model 100 is setup as a Partially Observable Markov Decision Process (POMDP). The true state of the environment is unknown. The object re-identification model 100 learns a stochastic policy $\pi((w_t, c_t)|s_{1:t}; \theta)$ with parameters $\theta=\{\theta_g, \theta_w, \theta_h, \theta_c\}$ that, at each step t, maps the past history $s_{1:t}=I_1$, $w_1, c_1, \ldots, I_{t-1}, w_{t-1}, c_{t-1}, I_t$ to two distributions over discrete actions: the frame weight $w_t$ (sub-policy $\pi_1$) determined by the temporal attention model 108 and the class posterior $c_t$ (sub-policy $\pi_2$) determined by the classifier model 112. The weight $w_t$ is sampled stochastically from a binary distribution parameterized by the temporal attention model $f_w$ ($g_t$; $\theta_w$) 108 at time t: $w_t \sim \pi_1$ ( ·|$f_w(g_t; \theta_w)$). The class posterior distribution is conditioned on the classifier model 112, which is attached to the output $h_t$: $c_t \sim \pi_2(\cdot|f_c(h_t; \theta_c))$ of recurrent model 110. The vector $h_t$ maintains an internal state of the environment as a summary of past observations. Note that, for simplicity of notation, the image of the input video 102 at time t is denoted as $I_t$, but the actual input may be the person region $D_{p, t}^g$. $I_{t+1}$ denotes the next frame in a sequence of frames of the input video 102.

The frame-level model 106 is configured to, for each frame of the input video 102 (e.g., via machine learning training), receive data derived from the frame, and output a frame-level confidence ($g_t$) indicating that a previously-recognized object is present in the frame. In the illustrated example, the frame-level model 106 is previously-trained to identify a previously-recognized person in the frame.

Given that there is little depth data but a large amount of RGB data available for person re-identification model training, it may be beneficial to leverage the RGB data to train depth models for frame-level feature extraction. The parameters at the bottom (i.e., closer to input layer) convolutional layers of a deep neural network can be directly shared between RGB and depth data through a simple depth encoding, that is, each pixel with depth D is replicated to three channels and encoded as (D,D,D), which corresponds to the three RGB channels. Based on the shared parameters, a pre-trained RGB deep convolutional network model can be selected for frame-level feature extraction, in some implementations.

FIG. 3A shows an example approach in which a color-based model re-identifies a previously-identified person from an input RGB (or color) frame 300. A first convolutional layer of the color-based model outputs filter responses 302 based on the frame 300. A second convolutional layer of the color-based model outputs filter responses 304 based on the frame 300. A third convolutional layer of the color-based model outputs filter responses 306 based on the frame 300.

FIG. 3B shows an example approach in which a depth-based model, such as frame-level model 106 shown in FIG. 1, re-identifies a previously-identified person from an input depth frame 308. A first convolutional layer of the depth-based model outputs filter responses 310 based on the depth frame 308. A second convolutional layer of the depth-based model outputs filter responses 312 based on the depth frame 308. A third convolutional layer of the depth-based model outputs filter responses 314 based on the depth frame 308.

Figure 4:
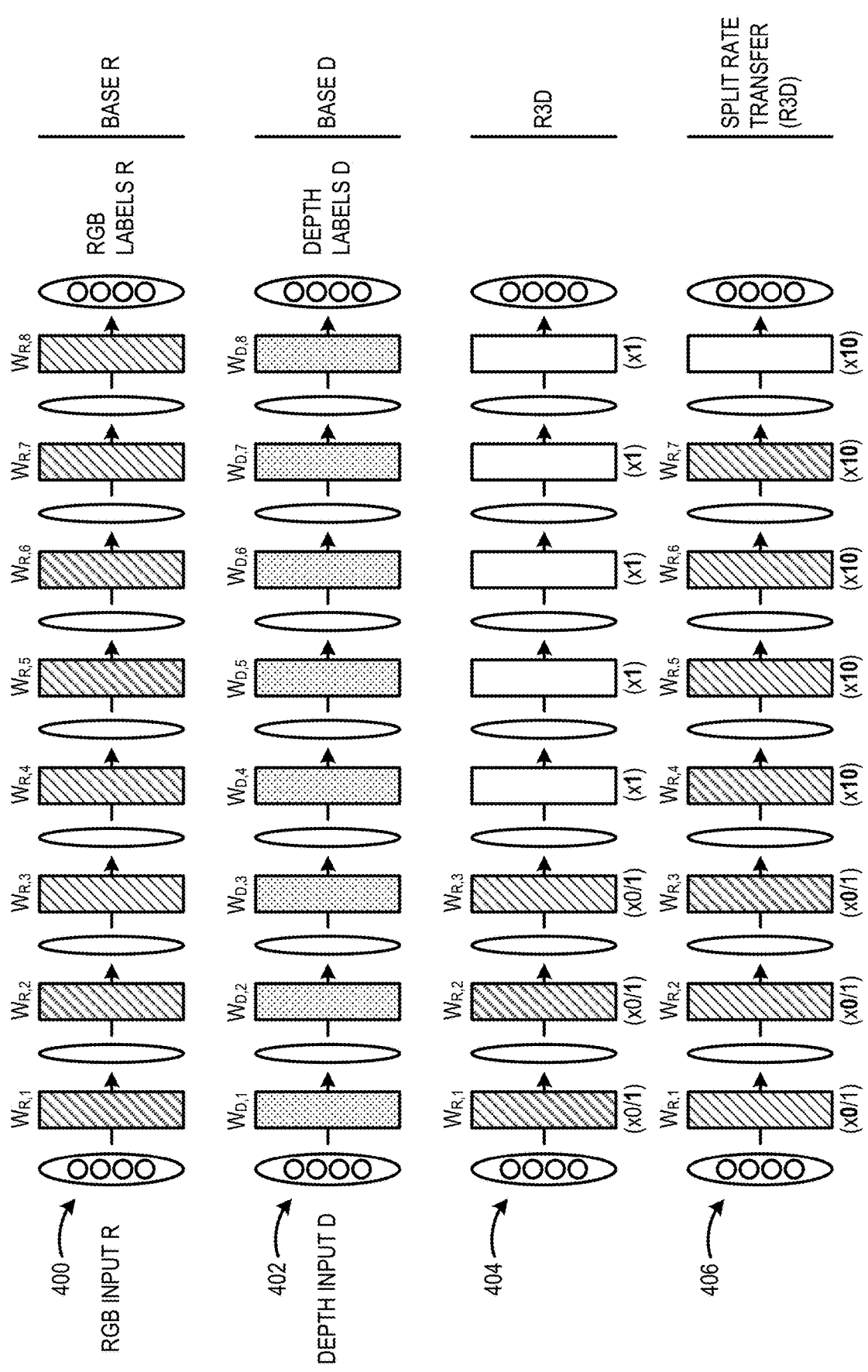
FIG. 4 shows a comparison of different object re-identification models trained differently.

In order to leverage the vast amount of available RGB training data, the herein disclosed approach relies on transferring parameters $\theta_g$ from an RGB pre-trained model for initialization. FIG. 4 shows different example object re-identification models trained differently. A model 400 is a color-based model that is trained from scratch solely with color (or RGB) image training data. A model 402 is a depth-base model that is trained from scratch with depth image training data.

As it is unclear whether and which subset of RGB parameters is beneficial for depth embedding, a model 404 transfers and slowly fine-tunes the weights of the bottom convolutional layers, while re-training the top layers (i.e., closer to output layer). In particular, the model 404 includes three bottom layers (e.g., $W_{R,1}$, $W_{R,2}$, $W_{R,3}$) that are initialized using the corresponding bottom three layers of the color-based model 400. The top five layers of the model 404 are trained from scratch based on depth data. The number below each layer of the model 404 indicates a relative learning rate of the layer (with the highest performing learning rate indicated in bold). The learning rate of a layer determines how much that layer changes in response to an estimated error, with higher learning rates corresponding to more drastic changes.

In the case of the model 404, each layer is trained using the same relatively slow learning rate (i.e., 1). Another approach used for transferring a model from a large to a small-sized dataset may copy and slowly fine-tune the weights of the whole hierarchy except for the classifier which is re-trained using a higher learning rate.

A model 406 includes seven bottom layers that are initialized using the corresponding bottom seven layers of the model 402. In other words, these layers are derived from the corresponding layers of the color-based model 402. The frame-level model 406 may include any suitable number of layers that are derived from corresponding layers of a color-based model. In the illustrated example, at least half of the plurality of layers of the model 406 are derived from corresponding layers of the color-based model 400.

The number below each layer of the model 406 indicates a relative learning rate of the layer (with the highest performing learning rate indicated in bold). In the case of the model 406, the bottom layers (e.g., $W_{R,1}$, $W_{R,2}$, $W_{R,3}$) of the RGB models can be shared with the depth data (without fine-tuning—e.g., a learning rate of zero). Further, fine-tuned parameters are transferred from the RGB data instead of training the top layers (e.g., $W_{R,4}$, $W_{R,5}$, $W_{R,6}$, $W_{R,7}$) from scratch which differs from the training of the model 404. Additionally, for the model 406 a slower (or zero) learning rate is used for the bottom layers and a higher learning rate (e.g., 10) is used for the top layers, which may be more effective than using a uniform learning rate across the hierarchy of the model. Based on these features, the herein disclosed approach is referred to as split-rate transfer.

As one example, such a pre-trained model may use batch normalization and may include 3×3 convolutional layers, followed by 6 Inception modules, and 2 fully connected layers. In one example, to make this network applicable to the specific person re-identification scenario, the pre-trained model may be modified to replace the top classification layer with a 256×N fully connected layer, where N is the number of subjects at the target dataset and its weights are initialized at random from a zero-mean Gaussian distribution with standard deviation 0.01. Also, a dropout regularization between the fully-connected layers may be added to the pre-selected model.

Returning to FIG. 1, the recurrent model ($f_{LSTM}(\theta_h)$) 110 is previously-trained to, for each frame of the input video 102, receive the frame-level confidence ($g_t$) output by the frame-level model 106 for the frame, receive a previous integrated confidence ($h_{t-1}$) output by the recurrent model 110 for a previous frame ($I_{t-1}$) of the input video 102, and output a current integrated confidence ($h_t$) based on a frame-level confidence (gt) and the previous integrated confidence ($h_{t-1}$). The recurrent model 110 may include efficient Long Short-Term Memory (LSTM) element units for modeling temporal dynamics for video recognition and captioning. In particular, assuming that σ( ) is sigmoid, g[t] is the input at time frame t, h[t−1] is the previous output of the module and c[t−1] is the previous cell, the implementation corresponds to the following updates:

$$i[t] = \sigma(W_{gi}g[t] + W_{hi}h[t-1] + b_i) \quad (1)$$

$$f[t] = \sigma(W_{gf}g[t] + W_{hf}h[t-1] + b_f) \quad (2)$$

$$z[t] = \tan h(W_{gc}g[t] + W_{hc}h[t-1] + b_c) \quad (3)$$

$$c[t] = f[t] \odot c[t-1] + i[t] \odot z[t] \quad (4)$$

$$o[t] = \sigma(W_{go}g[t] + W_{ho}h[t-1] + b_o) \quad (5)$$

$$h[t] = o[t] \odot \tan h(c[t]) \quad (6)$$

where $W_{sq}$ is the weight matrix from source s to target q for each gate q, $b_q$ are the biases leading into q, i[t] is the input gate, f[t] is the forget gate, z[t] is the input to the cell, c[t] is the cell, o[t] is the output gate, and h[t] is the output of this module. Finally, x⊙y denotes the element-wise product of vectors x and y.

The temporal attention model ($f_w(\theta_w)$) 108 is configured (e.g., via machine learning training) to, for each frame of the input video 102, receive the data derived from the frame, and output a weight ($w_t$) based on an assessed quality of the frame. In particular, the temporal attention model 108 may weight frames with higher relative quality more heavily than frames with lower relative quality. The temporal attention model 108 infers the importance wt of the image frame $I_t$, as the latter is represented by the feature encoding $g_t$. In one example, the temporal attention model 108 may include a linear layer which maps the 256×1 vector $g_t$ to one scalar, followed by Sigmoid non-linearity which squashes real-valued inputs to a [0, 1] range. Next, the output $w_t$ is defined by a Bernoulli random variable with probability mass function:

$$f(w_t; f_w(g_t; \theta_w)) = \begin{cases} f_w(g_t; \theta_w), & w_t = 1 \\ 1 - f_w(g_t; \theta_w), & w_t = 0 \end{cases} \quad (7)$$

The Bernoulli parameter is conditioned on the Sigmoid output $f_w(g_t; \theta_w)$, shaping a Bernoulli-Sigmoid unit. During training, the output $w_t$ is sampled stochastically to be a binary value in $\{0, 1\}$. During evaluation, instead of sampling from the distribution, the output is deterministically decided to be equal to the Bernoulli parameter and, therefore, $w_t = f_w(g_t; \theta_w)$.

Figure 5:
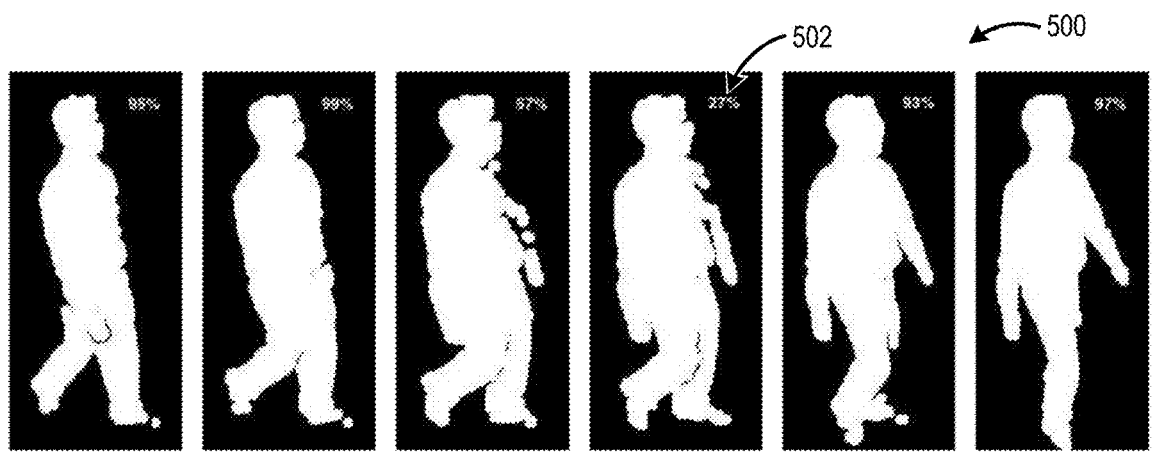
FIG. 5 shows an example sequence of image frames labeled with different weights assessed based on the quality of the image frames.

FIG. 5 shows an example sequence of image frames 500 and corresponding weights (e.g., weight 502=27% for the fourth frame illustrated in FIG. 5) applied to the image frames by the temporal attention model 108 shown in FIG. 1. As shown in the sequence of image frames 500, the weight or Bernoulli parameter value 502 may vary significantly even among neighboring frames based on the individual quality of the frames. For example, smaller weights are typically associated with noisy frames, frames with unusual pose (e.g., person turning), partial occlusions, and other features that lower the quality of the frame. Larger weights are typically associated with frames having more consistent boarders and more typical pose (e.g., a person facing the camera). The temporal attention model 108 may assign weight to the frames of the input video 102 in any suitable manner.

Returning to FIG. 1, the classifier model ($f_c(\theta_{cl})$) 112 is configured to (e.g., via machine learning training), for each frame of the input video 102, receive the current integrated confidence ($h_t$) output from the recurrent model 110, receive the weight ($w_t$) output from the temporal attention model 108, and output an overall confidence 104. In one example, the classifier model 112 includes a sequence of a rectified linear unit, dropout with rate r=0.4, a fully connected layer, and Softmax. The parametric layer maps the 256×1 hidden vector $h_t$ to the N×1 class posterior vector $c_t$, which has length equal to the number of classes N. The multi-shot prediction with RTA attention is the weighted sum of frame-level predictions $c_t$, as they are weighted by the normalized, RTA weights $$w'_t = \frac{f_w(g_t; \theta_w)}{\sum_{t=1}^{T} f_w(g_t; \theta_w)}.$$

The Bernoulli-Sigmoid unit is stochastic during training and therefore the REINFORCE algorithm is used in order to obtain the gradient for the backward pass. The reward function is defined as:

$$r_t = I(\arg\max(c_t) = g_t) \quad (8)$$

where $r_t$ is the raw reward, I is the indicator function and $g_t$ is the ground-truth class for frame t. Thus, at each time step t, the object re-identification model 100 receives a reward $r_t$, which equals 1 when the frame is correctly classified and 0 otherwise.

In some implementations, the parameters $\{\theta_g, \theta_h, \theta_c\}$ are learned by minimizing the classification loss that is attached on the recurrent model 110 via backpropagation backward through the whole model 100. The cross-entropy loss is minimized as customary in recognition tasks, such as face identification. Thus, the objective is to maximize the conditional probability of the true label given the observations, i.e., maximize $\log \pi_2(c_t^* | s_{1:t}; \theta_g, \theta_h, \theta_c)$, where $c_t^*$ is the true class at step t. The parameters $\{\theta_g, \theta_w\}$ are learned so that the object re-identification model 100 maximizes its total reward $R = \sum_{t=1}^{T} r_t$, where $r_t$ is defined in (8) above. This involves calculating the expectation $J(\theta_g, \theta_w) = E_{p(s_{1:T}; \theta_g, \theta_w)}[R]$ over the distribution of all possible sequences $p(s_{1:T}; \theta_g, \theta_w)$, which is intractable. Thus, a sample approximation, known as the REINFORCE rule, can be applied on the Bernoulli-Sigmoid unit, which models the sub-policy $\pi_1(w_t | f_w(g_t; \theta_w))$. Given the probability mass function $\log \pi_1(w_t; p_t) = w_t \log p_t + (1-wt) \log(1-p_t)$ with Bernoulli parameter $p_t = f_w(g_t; \theta_w)$, the gradient approximation is:

$$\nabla_{\theta_g, \theta_w} J = \sum_{t=1}^{T} E_{p(s_{1:T}; \theta_g, \theta_w)} [\nabla_{\theta_g, \theta_w} \log \pi_1(w_t | s_{1:t}; \theta_g, \theta_w)(R_t - b_t)] \quad (9)$$

$$\approx \frac{1}{M} \sum_{i=1}^{M} \sum_{t=1}^{T} \frac{w_t^i - p_t^i}{p_t^i(1 - p_t^i)} (R_t^i - b_t) \quad (10)$$

where sequences i, $i \in \{1, \ldots, M\}$, are obtained while running the object re-identification model 100 for M episodes and $R_t^i = \sum_{\tau=1}^{t} r_\tau^i$ is the cumulative reward at episode i acquired after collecting the sample $w_t^i$. The gradient estimate is biased by a baseline reward $b_t$ in order to achieve lower variance. $b_t = E_\pi[R_t]$, as the mean square error between $R_t^i$ and $b_t$ is also minimized by backpropagation. At each step t, the object re-identification model 100 makes a prediction wt and the reward signal$R_t^i$ evaluates the effectiveness of the object re-identification model 100 for the classification task. The REINFORCE update increases the log-probability of an action that results in higher than the expected accumulated reward (i.e., by increasing the Bernoulli parameter $f_w(g_t; \theta_w)$). Otherwise, the log-probability decreases for sequence of frames that lead to low reward. As such, the object re-identification model 100 jointly optimizes the accumulated reward and the classification loss, which constitute a hybrid supervised objective.

The object re-identification model 100 may be trained to re-identify any suitable number of different previously-recognized objects (e.g., different people). In implementations where the object re-identification model 100 is trained to re-identify a plurality of different previously-recognized people, the classifier model 112 may be trained to output a plurality of confidences corresponding to a plurality of different previously-recognized people. Each such confidence may indicate that a different previously-recognized person is present in the input video. For example, if a single previously-recognized person is present in the input video, then the object re-identification model 100 may output one overall confidence corresponding to the previously-recognized person that is significantly high and a plurality of overall confidences that correspond to other previously-recognized people that are significantly low. In some implementations, the object re-identification model 100 may be trained to output only a highest overall confidence corresponding to a previously-recognized person that is most likely present in the input video.

In some implementations, the object re-identification model 100 may be configured to operate in different modes. In a single-shot mode, the object re-identification model 100 is configured to assess a single frame using only the frame-level model 106 and the classifier model 112. In a multi-shot mode, the object re-identification model 100 is configured to processes sequences of frame—i.e., video. In multi-shot mode, the object re-identification model 100 uses the frame—level model 106, the recurrent model 110 and the classifier model 112. Further, in multi-shot mode, the video may be assessed with or without using the temporal attention model 108.

In some implementations, the object re-identification model 100 may be trained such that the parameters of the embedded layers of the frame-level model 106 may be pre-trained first, and afterwards the temporal attention model 108 and the recurrent model 110 may be trained. Finally, the classifier model 112 may be attached in order to train the whole model 100. At the second step, the weights of the embedding of the frame-level model 106 are frozen while the added layers are initialized at random. This modular training approach may be used so that both single-shot and multi-shot evaluation can be provided. On the other hand, the entire architecture can be trained end to end from scratch if processing video sequences is the sole objective without converting from color to depth.

The object re-identification model 100 may be trained using various training data sets. As one example, DPI-T (Depth-based Person Identification from Top) includes 12 people appearing in a total of 25 sequences across many days and wearing 5 different sets of clothes on average. Unlike most publicly available training datasets, the subjects appear from the top from an overhead view, which is a common scenario in automated video surveillance. The individuals are captured in daily life situations where the different people hold objects such as handbags, laptops, and coffee mugs.

As another example, BIWI includes sequences with varying human pose and scale, where 50 individuals appear in a living room. 28 of the individuals are re-recorded in a different room with new clothes and walking patterns. In some examples, the full training set may be used for training. In other examples, only the walking set may be used for training. In some examples, the frames with no person, a person heavily occluded from the image boundaries, and/or too far from the sensor may be omitted from the training set, as such images provide no skeleton information.

As another example, IIT PAVIS includes shorter video sequences. In particular, this training dataset includes 79 persons that are recorded in 5-frame walking sequences twice. Walking1 and Walking2 sequences may be used for training and testing sets, respectively.

As another example, TUM-GAID may be used to evaluate a large pool of identities. The TUM-GAID database contains RGB and depth video for 305 people in three variations. A subset of 32 people is recorded a second time after three months with different clothes.

The above are provided as examples, and any suitable RGB and/or depth training data set(s) may be used.

The various models included in the object re-identification model 100 may be trained and/or implemented in any suitable manner using any suitable framework(s) and/or testing and training environments. In one example, the frame-level model 106 may be trained in the Caffe framework. The input depth images may be resized to be 144×56. SGD mini-batches of 50 images may be used for training and testing. Momentum $\mu=0.5$ may yield stable training. The momentum effectively multiplies the size of the updates by a factor of $$\frac{1}{1-\mu}$$

after several iterations, so lower values result in smaller updates. The weight decay may be set to $2*10-4$, as it is common in Inception architecture. A base learning rate $0=3\times10-4$ may be employed. The learning rate may be reduced by a factor of 10 throughout training every time the loss reaches a "plateau".

In one example, the object re-identification model 100 may be implemented in Torch/Lua. Customized Caffe-to-Torch conversion scripts may be implemented for the pre-trained embedding, as the architecture is not standard. For end-to-end training, a momentum $\mu=0.9$, a batch size of 50, and a learning rate that linearly decreases from 0.01 to 0.0001 in 200 epochs up to 250 epochs maximum duration may be used. In on example, the recurrent model history may include $\rho=3$ frames.

Figure 6:
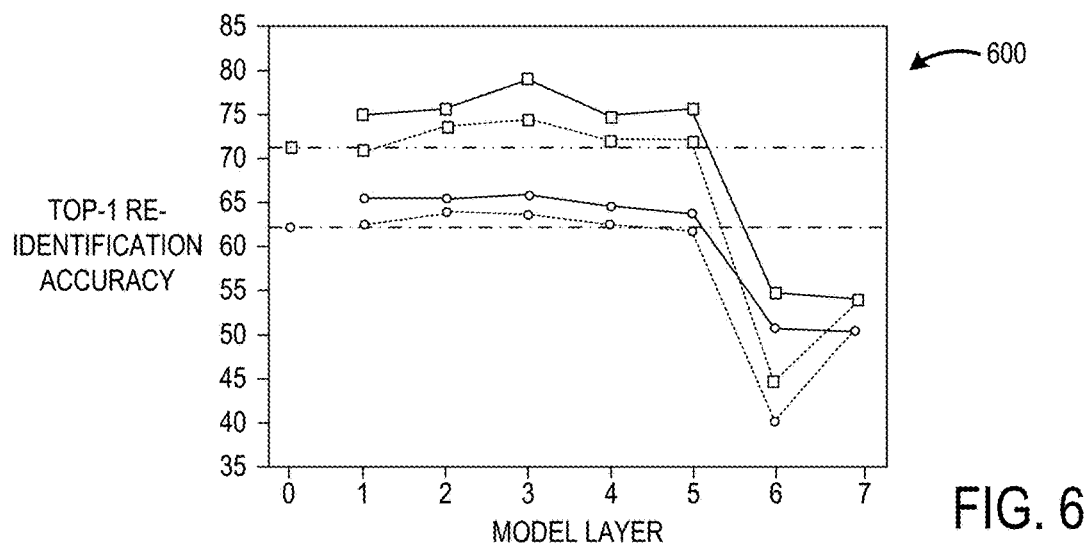
FIGS. 6 and 7 show graphs that compare re-identification accuracy of different models trained using different training approaches.
Figure 7:
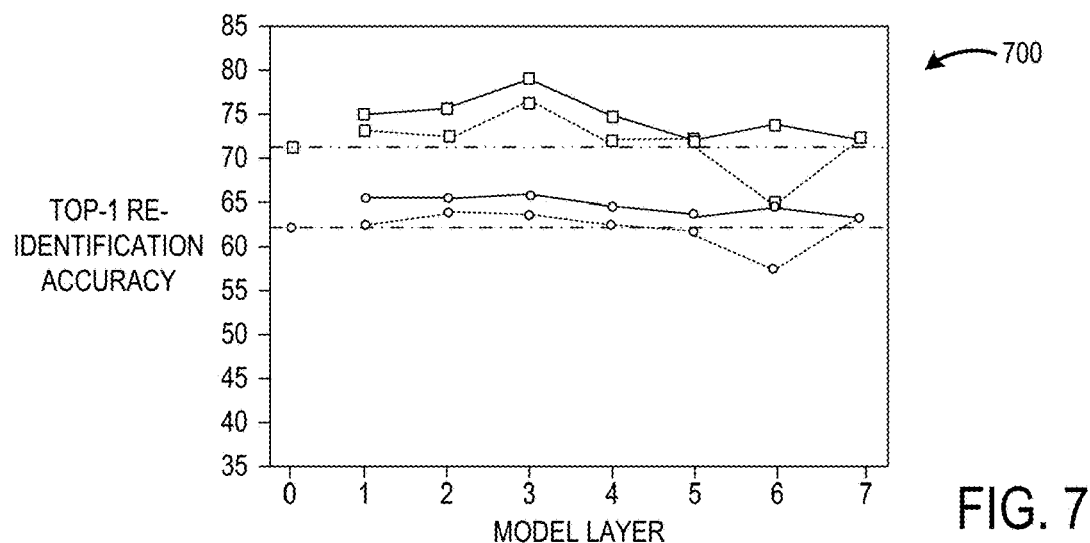

FIGS. 6 and 7 show graphs 600 and 700 indicating experimental results of an example object re-identification model trained using a split-rate RGB-to-Depth transfer approach, such as the model 406 shown in FIG. 4, as compared to a model trained using a previous transfer approach. The Y axis of the graphs indicate a top-1 re-identification accuracy percentage. Top-k (e.g., 1) accuracy equals the percentage of test images or sequences for which the ground-truth label is contained within the first k model predictions. Plotting the top-k accuracy as a function of k gives the Cumulative Matching Curve (CMC) shown in FIG. 10, for example. Integrating the area under the CMC curve and normalizing over the number of IDs produces the normalized Area Under the Curve (nAUC), listed in table 2 shown in FIG. 9, for example. The X axis of the graphs indicate the number of layers that are frozen or fine-tuned counting from the bottom layer of the convolutional neural network. The lower dot-dashed line indicates the accuracy of a depth-based model trained from scratch operating in a single shot mode. The upper dot-dot-dashed line indicates the accuracy of the depth-based model operating in multi-shot mode. The dotted line with circles indicates the accuracy of the previous model operating in single shot mode. The dotted line with squares indicates the accuracy of the previous model operating in multi-shot mode. The solid line with circles indicates the accuracy of the model trained using the split-rate transfer approach operating in single shot mode. The solid line with squares indicates the accuracy of the model trained using the split-rate transfer approach operating in multi-shot mode. In FIG. 6, the graph 600 indicates results of the model based on being trained using a split-rate transfer approach where the bottom layers of the CNN are frozen (e.g., a learning rate is set to zero). In FIG. 7, the graph 700 indicates results of the model based on being trained using a split-rate transfer approach where the bottom layers of the CNN are tuned slowly (e.g., a learning rate set to one). In both cases, the split-rate RGB-to-Depth transfer approach has top-1 re-identification accuracy on DPI-T when the bottom CNN layers are frozen (left) and slowly fine-tuned (right). In the split-rate RGB-to-Depth transfer approach, the top layers are transferred from RGB and rapidly fine-tuned, while in the other approach the top layers are re-trained.

As shown in FIGS. 6 and 7, transferring and freezing the three bottom layers, while rapidly fine-tuning the subsequent "inception" and fully-connected layers, provides improved performance on DPI-T in relation to the previous approach. Attempting to freeze too many layers may lead to performance drop for both approaches, which can be attributed to feature specificity. Slowly fine-tuning the bottom layers helps to alleviate fragile coadaptation and/or improves generalization, especially while moving towards the right of the x axis. Overall, the split-rate RGB-to-Depth transfer approach is believed to be more accurate in the tested setting across the x axis for both treatments.

FIG. 8 shows a table (i.e., Table 1) that compares the herein disclosed framework with depth-based baseline algorithms. First, performance based on uniformly random guessing is shown. Next, performance of approaches that use hand-crafted features based on biometrics, such as distances between skeleton joints is shown. Next, the performance of a 3D CNN with average pooling over time and the gait energy volume in multi-shot mode is shown. The performance of 3D and 4D RAM models are shown. In order to evaluate the herein disclosed model in multi-shot mode without temporal attention, the output of the classifier attached on the CNN-LSTM output is averaged across the sequence. In the last two rows of the table, results that leverage temporal attention are shown. The RTA attention of the herein disclosed model is compared with the soft attention of another approach, which is a function of both the hidden state ht and the embedding gt, whose projections are added and passed through a tan h non-linearity.

As shown in Table 1, the end-to-end re-identification features perform significantly more accurately than the ones that rely on hand-crafted biometrics on all datasets. The herein disclosed algorithm is the top performer in multi-shot mode, as the RTA unit effectively learns to re-weight the most effective frames based on classification-specific reward. The split-rate RGB-to-Depth transfer enables the herein disclosed approach to leverage RGB data effectively and provides discriminative depth-based ReID features. This is especially reflected by the single-shot accuracy on DPI-T, where the herein disclosed approach provides 19.3% higher top-1 accuracy as compared to 3D RAM. It is believed that the spatial attention mechanism is more influential in datasets with significant variation in human pose and/or partial body occlusions. On the other hand, it is believed that the spatial attention is less influential on DPI-T, which contains views from the top and the visible region is mostly uniform across frames.

To demonstrate the effectiveness of the herein disclosed split-rate RGB-to-Depth transfer approach, the approach is compared to a previous RGB method in a scenario where individuals change clothes between recordings for training and testing datasets. In this scenario, the TUM-GAID database is used for the training and testing datasets at which 305 persons appear in sequences n01-n06 from session 1, and 32 among them appear with new clothes in sequences n07-n12 from session 2. Following the official protocol, Training IDs are used to perform RGB-to-Depth transfer for the CNN embedding. Sequences n01-n04, n07-n10 are used for training, and sequences n05-n06 and n11-n12 are used for validation. Next, the Testing IDs and use sequences n01-n04 are used for training, n05-n06 are used for validation and n11-n12 are used for testing. Thus, the framework has no access to data from the session 2 during training. However, the assumption is made that the 32 subjects that participate in the second recording are known for all competing methods.

FIG. 9 shows a table (i.e., Table 2) that indicates that re-identification from body depth is more robust than from body RGB in the above described testing scenario, presenting 6.2% higher top-1 accuracy and 10.7% larger nAUC in single-shot mode. Next, the benefit of using head information, which is less sensitive than clothes to day-by-day changes is described. To that end, an RGB-based pre-trained model may be transferred from RGB to depth and an upper body part of the model may be fine-tuned to produce what is referred to as the "Head RGB" model. This model produces results having increased accuracy, individually and jointly with body depth. Further, the mutual benefits in multi-shot performance are shown for both body depth, head RGB and their linear combination in class posterior.

Figure 10:
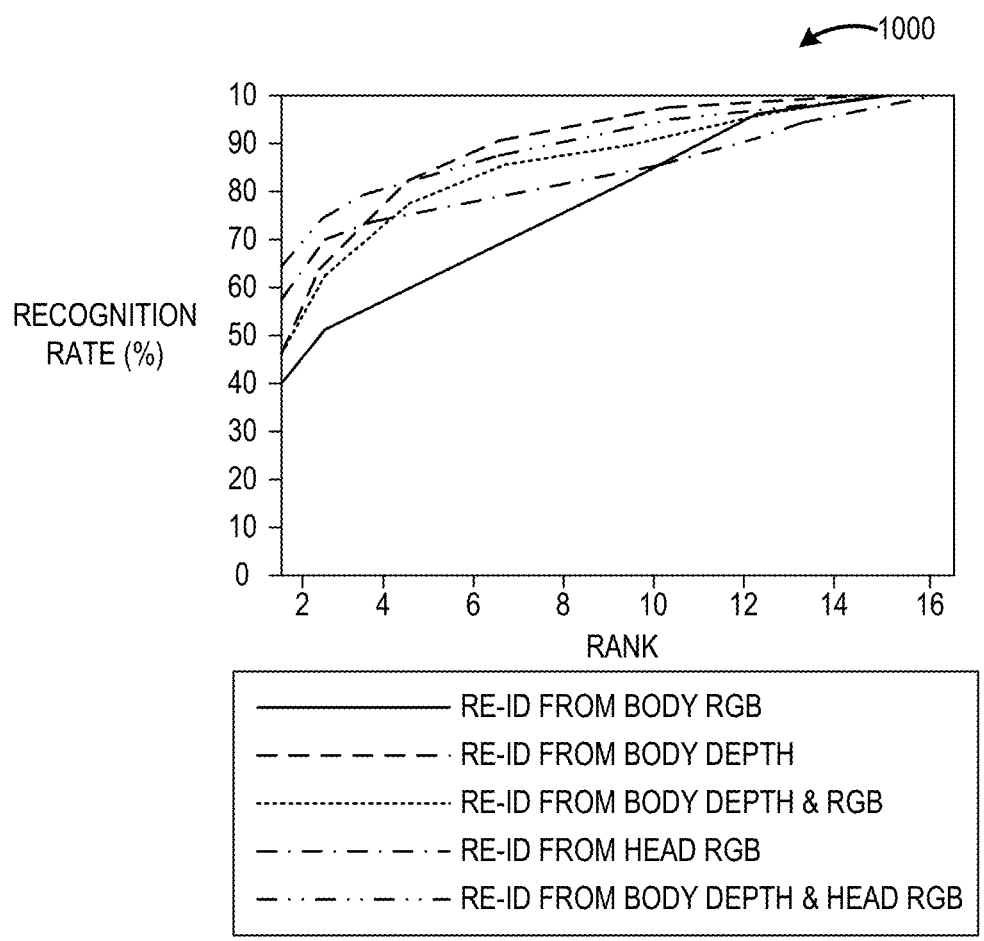
FIG. 10 shows a graph of cumulative matching curves corresponding to the different models listed in the table of FIG. 9.

FIG. 10 shows a graph 1000 of CMC curves for the single-shot setting of the above described testing scenario. As indicated by the graph 1000, the re-identification (ReID) accuracy from body depth scales with greater accuracy than its counterparts, which is validated by the nAUC scores shown in Table 2 of FIG. 9.

Figure 11:
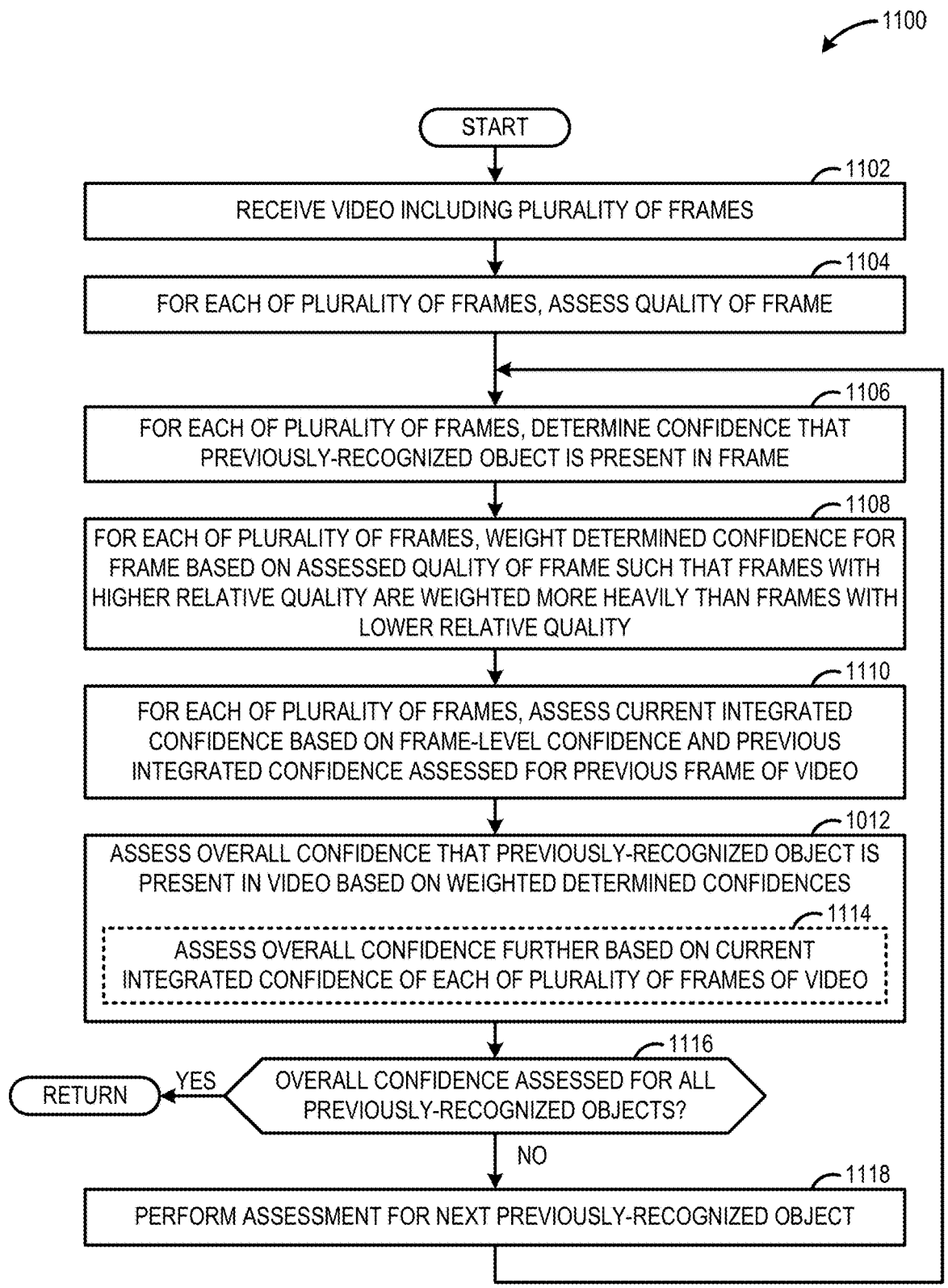
FIG. 11 shows an example object re-identification method.

FIG. 11 shows an example object re-identification method 1100. For example, the method 1100 may be performed by the object re-identification model 100 shown in FIG. 1 and/or the computing system 1200 of FIG. 12. At 1102, video including a plurality of frames is received. For example, the video may be depth video including a plurality of depth frames and/or RGB video including RGB frames. At 1104, for each of the plurality of frames, a quality of the frame is assessed. For example, the quality of the frame may be assessed by the temporal attention model 108 shown in FIG. 1. At 1106, for each of the plurality of frames, a confidence that a previously-recognized object is present in the frame is determined. For example, the frame-level confidence may be assessed by the frame-level model 106 shown in FIG. 1. At 1108, for each of the plurality of frames, the determined confidence of the frame is weighted based on the assessed quality of the frame, such that frames with higher relative quality are weighted more heavily than frames with lower relative quality. For example, the weight may be determined by the temporal attention model 108 shown in FIG. 1. At 1110, for each of the plurality of frames, a current integrated confidence is assessed for the frame based on the determined frame-level confidence and a previous integrated confidence assessed for a previous frame of the video. For example, the current integrated confidence may be assessed by the recurrent model 110 shown in FIG. 1. At 1112, an overall confidence that the previously-recognized object is present in the video is assessed based on the weighted frame-level confidences of the plurality of frames of the video. In some implementations, at 1114, the overall confidence optionally may be determined further based on the current integrated confidence of each of the plurality of frames of the video. At 1116, it is determined whether an overall confidence is determined for all previously-recognized objects. In implementations where the method 1100 is performed to re-identify a single previously-recognized object in the video, then the method 1100 ends. In implementations where the method 1100 is performed to re-identify a plurality of different previously-recognized objects in the video, if an overall confidence has been assessed for all of the plurality of different previously-recognized objects in the video, then the method 1100 ends.

Otherwise, the method 1100 moves to 1118. At 1108, an assessment is performed for a next previously-recognized object of the plurality of previously-objects by returning to 1106 and starting that portion of the method 1100 again. Such portions of the method 1100 may be performed repeatedly or in parallel until overall confidences for all of the previously-identified object have been assessed.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 12:
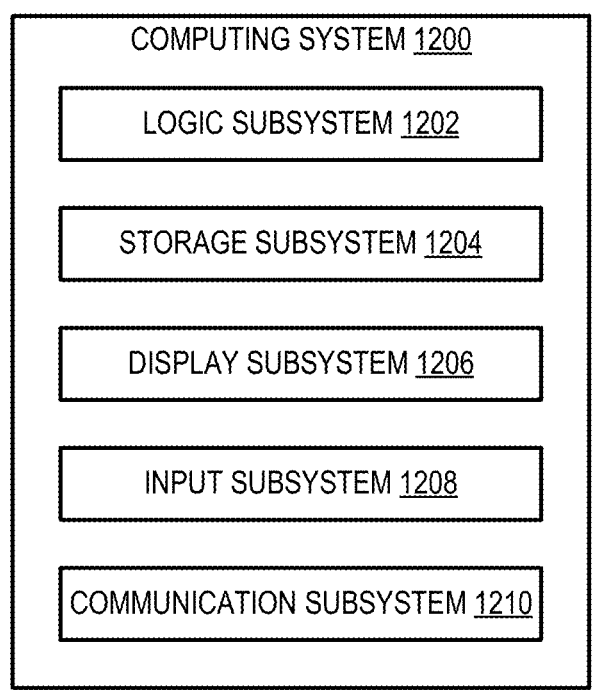
FIG. 12 shows an example computing system.

FIG. 12 schematically shows a simplified representation of a computing system 1200 configured to provide any to all of the compute functionality described herein. Computing system 1200 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices. For example, the computing system 1200 may be configured to implement the object re-identification model 100 shown in FIG. 1.

Computing system 1200 includes a logic subsystem 1202 and a storage subsystem 1204. Computing system 1200 may optionally include a display subsystem 1206, input subsystem 1208, communication subsystem 1200, and/or other subsystems not shown in FIG. 12.

Logic subsystem 1200 includes one or more physical devices configured to execute instructions. For example, the logic subsystem 1202 may be configured to execute instructions that are part of one or more applications, services, or other logical constructs. The logic subsystem 1202 may include one or more hardware processors configured to execute software instructions. Additionally or alternatively, the logic subsystem 1202 may include one or more hardware or firmware devices configured to execute hardware or firmware instructions. Processors of the logic subsystem 1202 may be single-core or multi-core, and the instructions executed thereon may be configured for sequential, parallel, and/or distributed processing. Individual components of the logic subsystem 1202 optionally may be distributed among two or more separate devices, which may be remotely located and/or configured for coordinated processing. Aspects of the logic subsystem 1202 may be virtualized and executed by remotely-accessible, networked computing devices configured in a cloud-computing configuration.

Storage subsystem 1204 includes one or more physical devices configured to temporarily and/or permanently hold computer information such as data and instructions executable by the logic subsystem 1202. When the storage subsystem 1204 includes two or more devices, the devices may be collocated and/or remotely located. Storage subsystem 1204 may include volatile, nonvolatile, dynamic, static, read/write, read-only, random-access, sequential-access, location-addressable, file-addressable, and/or content-addressable devices. Storage subsystem 1204 may include removable and/or built-in devices. When the logic subsystem 1202 executes instructions, the state of storage subsystem 1204 may be transformed—e.g., to hold different data.

Aspects of logic subsystem 1202 and storage subsystem 1204 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem 1202 and the storage subsystem 1204 may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, expectation maximization, and/or reinforced learning methods. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 1206 may be used to present a visual representation of data held by storage subsystem 1204. This visual representation may take the form of a graphical user interface (GUI). Display subsystem 1206 may include one or more display devices utilizing virtually any type of technology. In some implementations, display subsystem 1206 may include one or more virtual-, augmented-, or mixed reality displays.

When included, input subsystem 1208 may comprise or interface with one or more input devices. An input device may include a sensor device or a user input device. Examples of user input devices include a keyboard, mouse, touch screen, or game controller. In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 1210 may be configured to communicatively couple computing system 1200 with one or more other computing devices. Communication subsystem 1210 may include wired and/or wireless communication devices compatible with one or more different communication protocols. The communication subsystem 1210 may be configured for communication via personal-, local- and/or wide-area networks.

The methods and processes disclosed herein may be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Whenever user data is collected for any purpose, the user data should only be collected with the utmost respect for user privacy (e.g., user data may be collected only when the user owning the data provides affirmative consent, and/or the user owning the data may be notified whenever the user data is collected). If the data is to be released for access by anyone other than the user or used for any decision-making process, the user's consent may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

When the methods and processes described herein incorporate ML and/or AI components, the ML and/or AI components may make decisions based at least partially on training of the components with regard to training data. Accordingly, the ML and/or AI components can and should be trained on diverse, representative datasets that include sufficient relevant data for diverse users and/or populations of users. In particular, training data sets should be inclusive with regard to different human individuals and groups, so that as ML and/or AI components are trained, their performance is improved with regard to the user experience of the users and/or populations of users.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

ML and/or AI components may be designed to provide context as to how they operate, so that implementers of ML and/or AI systems can be accountable for decisions/assessments made by the systems. For example, ML and/or AI systems may be configured for replicable behavior, e.g., when they make pseudo-random decisions, random seeds may be used and recorded to enable replicating the decisions later. As another example, data used for training and/or testing ML and/or AI systems may be curated and maintained to facilitate future investigation of the behavior of the ML and/or AI systems with regard to the data. Furthermore, ML and/or AI systems may be continually monitored to identify potential bias, errors, and/or unintended outcomes.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method comprises for each of a plurality of frames of a video, assessing a quality of the frame, for each of the plurality of frames, determining a confidence that a previously-recognized object is present in the frame, for each of the plurality of frames, weighting the determined confidence for the frame based on the assessed quality of the frame such that frames with higher relative quality are weighted more heavily than frames with lower relative quality, and assessing an overall confidence that the previously-recognized object is present in the video based on the weighted determined confidences. In this example and/or other examples, the method may further comprise for each of the plurality of frames, assessing a current integrated confidence based on the frame-level confidence and a previous integrated confidence assessed for a previous frame of the video, and wherein the overall confidence is assessed based on the current integrated confidences in addition to the weighted determined confidences. In this example and/or other examples, the method may further comprise for a plurality of different previously-recognized objects, assessing the overall confidence that the previously-recognized object is present in the video based on weighted determined confidences for each of the plurality of frames corresponding to the previously-recognized object. In this example and/or other examples, for each of the plurality of frames, the confidence may be determined using a convolutional neural network. In this example and/or other examples, the convolutional neural network may include a plurality of layers, and different layers of the plurality of layers may have different learning rates. In this example and/or other examples, the video may include depth video. In this example and/or other examples, for each of the plurality of frames, the confidence may be determined using a convolutional neural network that includes a first subset of layers derived from a color-based model previously-trained to classify a color frame, wherein the first subset of layers has a first learning rate, wherein the convolutional neural network includes a second subset of layers having a second learning rate that is higher than the first learning rate, and wherein the first subset of layers are closer to an input layer of the convolutional neural network than the second subset of layers.

In an example, a storage machine holds instructions executable by a logic machine, the instructions comprise instructions to, for each of a plurality of frames of a video, assess a quality of the frame, instructions to, for each of the plurality of frames, determine a confidence that a previously-recognized object is present in the frame, instructions to, for each of the plurality of frames, weight the determined confidence for the frame based on the assessed quality of the frame such that frames with higher relative quality are weighted more heavily than frames with lower relative quality, and instructions to, assess an overall confidence that the previously-recognized object is present in the video based on the weighted determined confidences. In this example and/or other examples, the instructions may further comprise instructions to, for each of the plurality of frames, assess a current integrated confidence based on the frame-level confidence and a previous integrated confidence assessed for a previous frame of the video, and wherein the overall confidence is assessed based on the current integrated confidences in addition to the weighted determined confidences. In this example and/or other examples, the instructions may further comprise instructions to, for a plurality of different previously-recognized objects, assess the overall confidence that the previously-recognized object is present in the video based on weighted determined confidences for each of the plurality of frames corresponding to the previously-recognized object. In this example and/or other examples, for each of the plurality of frames, the confidence may be determined using a convolutional neural network. In this example and/or other examples, the convolutional neural network may include a plurality of layers, and wherein different layers of the plurality of layers have different learning rates. In this example and/or other examples, the video may include depth video. In this example and/or other examples, for each of the plurality of frames, the confidence may be determined using a convolutional neural network that includes a first subset of layers derived from a color-based model previously-trained to classify a color frame, wherein the first subset of layers has a first learning rate, wherein the convolutional neural network includes a second subset of layers having a second learning rate that is higher than the first learning rate, and wherein the first subset of layers are closer to an input layer of the convolutional neural network than the second subset of layers.

In an example, a computing system comprises a logic machine, and a storage machine holding instructions executable by the logic machine to instantiate a re-identification model previously-trained to receive data derived from a video including a plurality of frames, and output an overall confidence indicating that a previously-recognized object is present in the video, the re-identification model including a frame-level model configured to, for each of the plurality of frames, receive the data derived from the frame, and output a frame-level confidence indicating that the previously-recognized object is present in the frame, a temporal attention model configured to, for each of the plurality of frames, receive the data derived from the frame, and output a weight based on a quality of the frame, wherein frames with higher relative quality are weighted more heavily than frames with lower relative quality, a recurrent model configured to, for each of the plurality of frames, output a current integrated confidence based on the frame-level confidence output by the frame-level model for the frame and a previous integrated confidence output by the recurrent model for a previous frame, and a classifier model configured to, for each of the plurality of frames, determine a weighted confidence for the frame based on the current integrated confidence output from the recurrent model and the weight output from the temporal attention model, and output the overall confidence based on the weighted confidences of the plurality of frames. In this example and/or other examples, the frame-level model may be a convolutional neural network. In this example and/or other examples, the video may include a depth video. In this example and/or other examples, for each of the plurality of frames, the confidence may be determined using a convolutional neural network that includes a first subset of layers derived from a color-based model previously-trained to classify a color frame, wherein the first subset of layers has a first learning rate, wherein the convolutional neural network includes a second subset of layers having a second learning rate that is higher than the first learning rate, and wherein the first subset of layers are closer to an input layer of the convolutional neural network than the second subset of layers. In this example and/or other examples, the first learning rate of the first subset of layers may be zero. In this example and/or other examples, the classifier model may be configured to output a plurality of confidences corresponding to a plurality of different previously-recognized objects, each confidence indicating that a different previously-recognized object is present in the depth video.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method, comprising:
for each of a plurality of frames of a video captured by a single camera, assessing a quality of the frame;
for each of the plurality of frames of the video captured by the single camera, determining a confidence that a previously-recognized object is present in the frame;
for each of the plurality of frames of the video captured by the single camera, weighting the determined confidence for the frame based on the assessed quality of the frame such that frames with higher relative quality are weighted more heavily than frames with lower relative quality; and
assessing an overall confidence that the previously-recognized object is present in the video captured by the single camera based on the weighted determined confidences.

2. The method of claim 1, further comprising:
for each of the plurality of frames of the video captured by the single camera, assessing a current integrated confidence based on the frame-level confidence and a previous integrated confidence assessed for a previous frame of the video captured by the single camera, and wherein the overall confidence is assessed based on the current integrated confidences in addition to the weighted determined confidences.

3. The method of claim 1, further comprising:
for a plurality of different previously-recognized objects, assessing the overall confidence that the previously-recognized object is present in the video captured by the single camera based on weighted determined confidences for each of the plurality of frames of the video captured by the single camera corresponding to the previously-recognized object.

4. The method of claim 1, wherein for each of the plurality of frames of the video captured by the single camera, the confidence is determined using a convolutional neural network.

5. The method of claim 4, wherein the convolutional neural network includes a plurality of layers, and wherein different layers of the plurality of layers have different learning rates.

6. The method of claim 1, wherein the video includes depth video captured by a single depth camera.

7. The method of claim 6, wherein for each of the plurality of frames of the video captured by the single camera, the confidence is determined using a convolutional neural network that includes a first subset of layers derived from a color-based model previously-trained to classify a color frame, wherein the first subset of layers has a first learning rate, wherein the convolutional neural network includes a second subset of layers having a second learning rate that is higher than the first learning rate, and wherein the first subset of layers are closer to an input layer of the convolutional neural network than the second subset of layers.

8. A storage machine holding instructions executable by a logic machine, the instructions comprising:

instructions to, for each of a plurality of frames of a video captured by a single camera, assess a quality of the frame;
instructions to, for each of the plurality of frames of the video captured by the single camera, determine a confidence that a previously-recognized object is present in the frame;
instructions to, for each of the plurality of frames of the video captured by the single camera, weight the determined confidence for the frame based on the assessed quality of the frame such that frames with higher relative quality are weighted more heavily than frames with lower relative quality; and
instructions to, assess an overall confidence that the previously-recognized object is present in the video captured by the single camera based on the weighted determined confidences.

9. The storage machine of claim 8, wherein the instructions further comprise instructions to, for each of the plurality of frames of the video captured by the single camera, assess a current integrated confidence based on the frame-level confidence and a previous integrated confidence assessed for a previous frame of the video, and wherein the overall confidence is assessed based on the current integrated confidences in addition to the weighted determined confidences.

10. The storage machine of claim 8, wherein the instructions further comprise instructions to, for a plurality of different previously-recognized objects, assess the overall confidence that the previously-recognized object is present in the video captured by the single camera based on weighted determined confidences for each of the plurality of frames of the video captured by the single camera corresponding to the previously-recognized object.

11. The storage machine of claim 8, wherein for each of the plurality of frames of the video captured by the single camera, the confidence is determined using a convolutional neural network.

12. The storage machine of claim 11, wherein the convolutional neural network includes a plurality of layers, and wherein different layers of the plurality of layers have different learning rates.

13. The storage machine of claim 8, wherein the video includes depth video captured by a single depth camera.

14. The storage machine of claim 13, wherein for each of the plurality of frames, the confidence is determined using a convolutional neural network that includes a first subset of layers derived from a color-based model previously-trained to classify a color frame, wherein the first subset of layers has a first learning rate, wherein the convolutional neural network includes a second subset of layers having a second learning rate that is higher than the first learning rate, and wherein the first subset of layers are closer to an input layer of the convolutional neural network than the second subset of layers.

15. A computing system comprising:
a logic machine; and
a storage machine holding instructions executable by the logic machine to instantiate:
a re-identification model previously-trained to receive data derived from a video including a plurality of frames, and output an overall confidence indicating that a previously-recognized object is present in the video, the re-identification model including:
a frame-level model configured to, for each of the plurality of frames, receive the data derived from the frame, and output a frame-level confidence indicating that the previously-recognized object is present in the frame;

a temporal attention model configured to, for each of the plurality of frames, receive the data derived from the frame, and output a weight based on a quality of the frame, wherein frames with higher relative quality are weighted more heavily than frames with lower relative quality;

a recurrent model configured to, for each of the plurality of frames, output a current integrated confidence based on the frame-level confidence output by the frame-level model for the frame and a previous integrated confidence output by the recurrent model for a previous frame; and a classifier model configured to, for each of the plurality of frames, determine a weighted confidence for the frame based on the current integrated confidence output from the recurrent model and the weight output from the temporal attention model, and output the overall confidence based on the weighted confidences of the plurality of frames.

16. The computing system of claim 15, wherein the frame-level model is a convolutional neural network.

17. The computing system of claim 16, wherein the video includes a depth video.

18. The computing system of claim 17, wherein for each of the plurality of frames, the confidence is determined using a convolutional neural network that includes a first subset of layers derived from a color-based model previously-trained to classify a color frame, wherein the first subset of layers has a first learning rate, wherein the convolutional neural network includes a second subset of layers having a second learning rate that is higher than the first learning rate, and wherein the first subset of layers are closer to an input layer of the convolutional neural network than the second subset of layers.

19. The computing system of claim 18, wherein the first learning rate of the first subset of layers is zero.

20. The computing system of claim 15, wherein the classifier model is configured to output a plurality of confidences corresponding to a plurality of different previously-recognized objects, each confidence indicating that a different previously-recognized object is present in the depth video.

* * * * *